United States Patent [19]

Dietrich, Sr.

[11] 4,245,706
[45] Jan. 20, 1981

[54] ONE-PASS COMPLETE TILLAGE SYSTEM

[75] Inventor: William J. Dietrich, Sr., Congerville, Ill.

[73] Assignee: DMI, Inc., Goodfield, Ill.

[21] Appl. No.: 934,585

[22] Filed: Aug. 17, 1978

[51] Int. Cl.³ .......................................... A01B 13/08
[52] U.S. Cl. ................................. 172/180; 172/196; 176/700
[58] Field of Search .............. 172/180, 181, 182, 178, 172/700, 690, 694, 152, 153, 154, 156, 603, 771, 413

[56] References Cited

U.S. PATENT DOCUMENTS

| | | | |
|---|---|---|---|
| 184,171 | 11/1876 | Porter | 172/700 |
| 461,537 | 10/1891 | Lindgren | 172/271 X |
| 1,557,109 | 10/1925 | Vandeberg | 172/603 X |
| 2,034,229 | 3/1936 | Davis | 172/153 |
| 2,034,461 | 3/1936 | Daughtery | 172/772 X |
| 2,766,672 | 10/1956 | Zunk | 172/156 |
| 3,039,542 | 6/1962 | Vonville | 172/271 X |
| 3,180,430 | 4/1965 | Launder | 172/700 |
| 3,757,871 | 9/1973 | Maust | 172/413 |

OTHER PUBLICATIONS

DMI–Presents the New "H" Series V–Chisel, published for DMI Inc., Goodfield, Ill., undated.
Krause Offset Disc Harrow 1480 Series-p, published for Krause Plow Corp., Hutchinson, Ka.
Hoe-Boe Plow–published for Lee Blacksmith Inc., South Rochelle, Ill.
Listers and Bedders, pp. 201-207 and 233, from book entitled Fundamentals of Machine Operation-Tillage-John Deere Service, pub. 1976.

Primary Examiner—Richard J. Johnson
Attorney, Agent, or Firm—Emrich, Root, Lee, Brown & Hill

[57] ABSTRACT

The system includes a pull-type frame with a forward line of disc blades widely spaced to part the trash, mix it with soil and displace most of the mixture laterally on top of previously undisturbed soil, thereby creating strips of ground which are alternately cleared and windrowed. At least a second line of disc blades, also widely spaced, is placed to the rear of the first line; and these blades are offset laterally from, and located in the windrows formed by, the discs of the first row, to part and return at least some of the previously cleared trash and previously undisturbed soil back onto the cleared strips while still leaving strips of undisturbed soil with an accumulation of cleared trash on top. Following the discs are novel plow tips located in the undisturbed strips having accumulated layers of cleared trash. The plow tips each include a tooth for breaking the soil and wings which twist and turn the broken soil without throwing it to the side, thereby mixing the trash with top soil, evenly distributing the mixed soil and trash, burying a controlled amount of trash, and bringing up some deep soil, all without creating a plow sole or digging up the buried trash.

2 Claims, 16 Drawing Figures

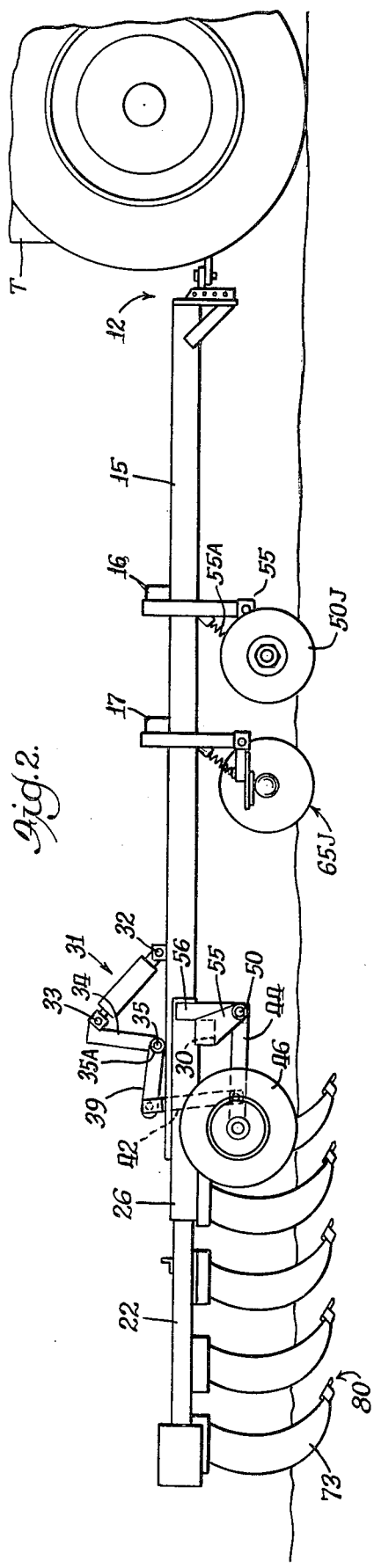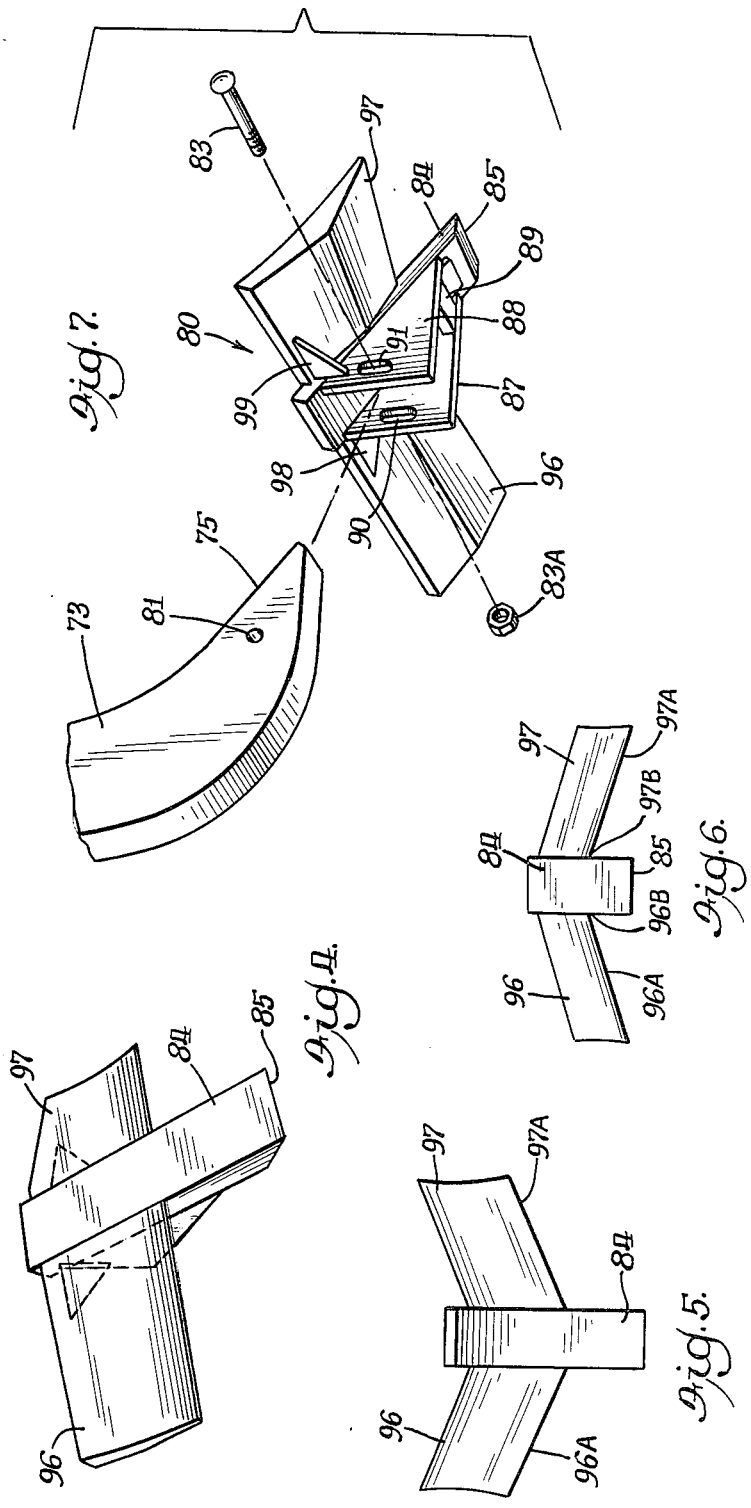

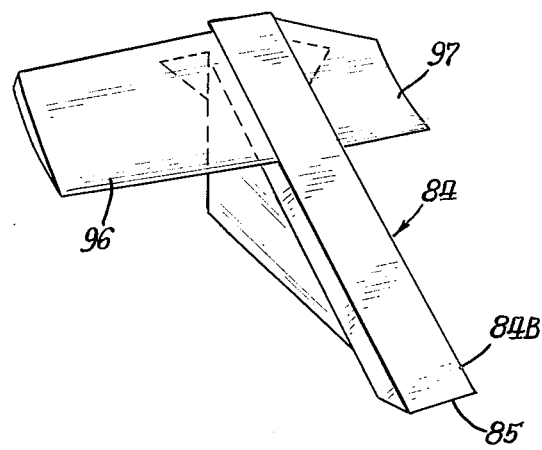
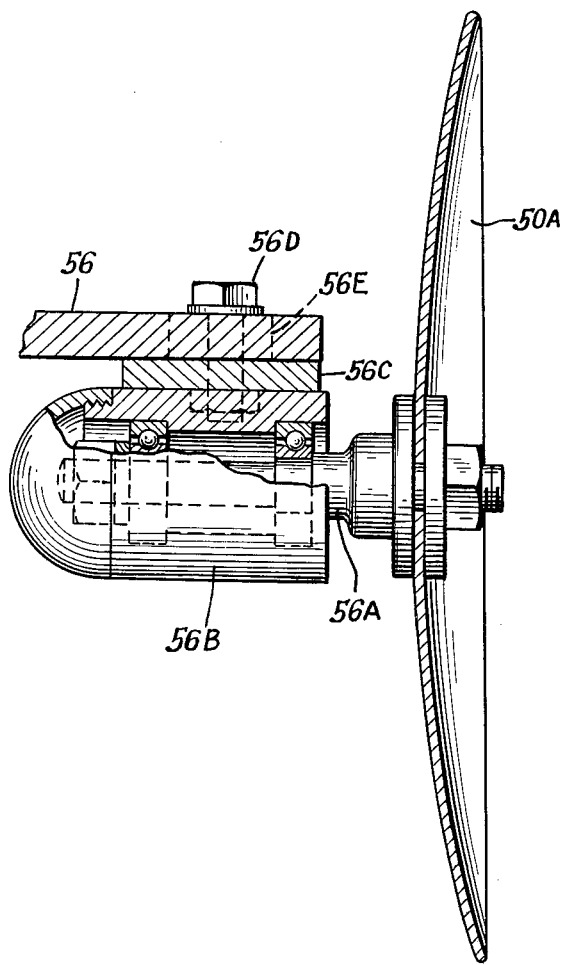
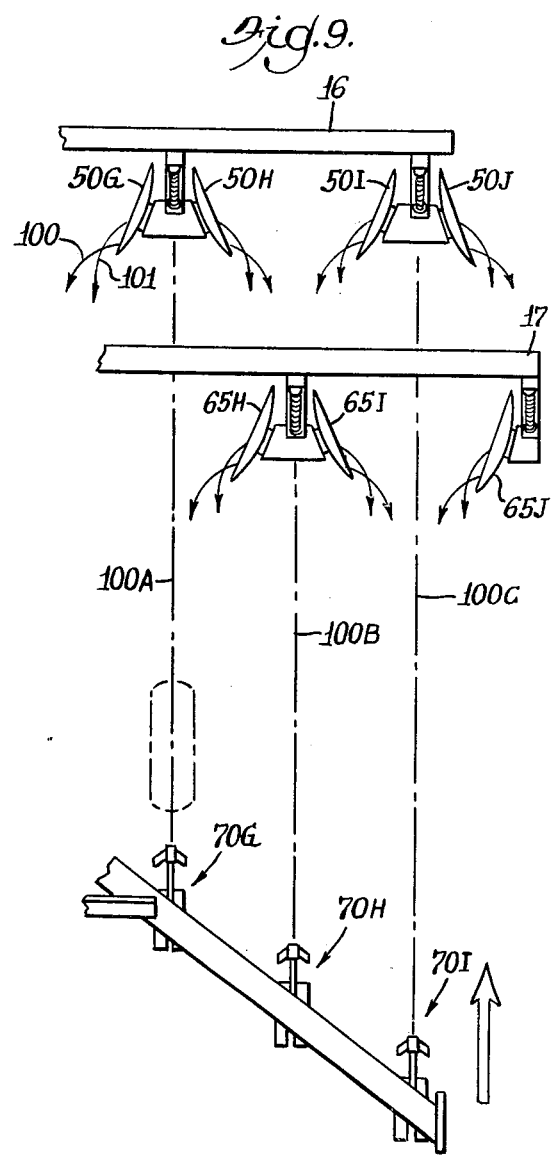

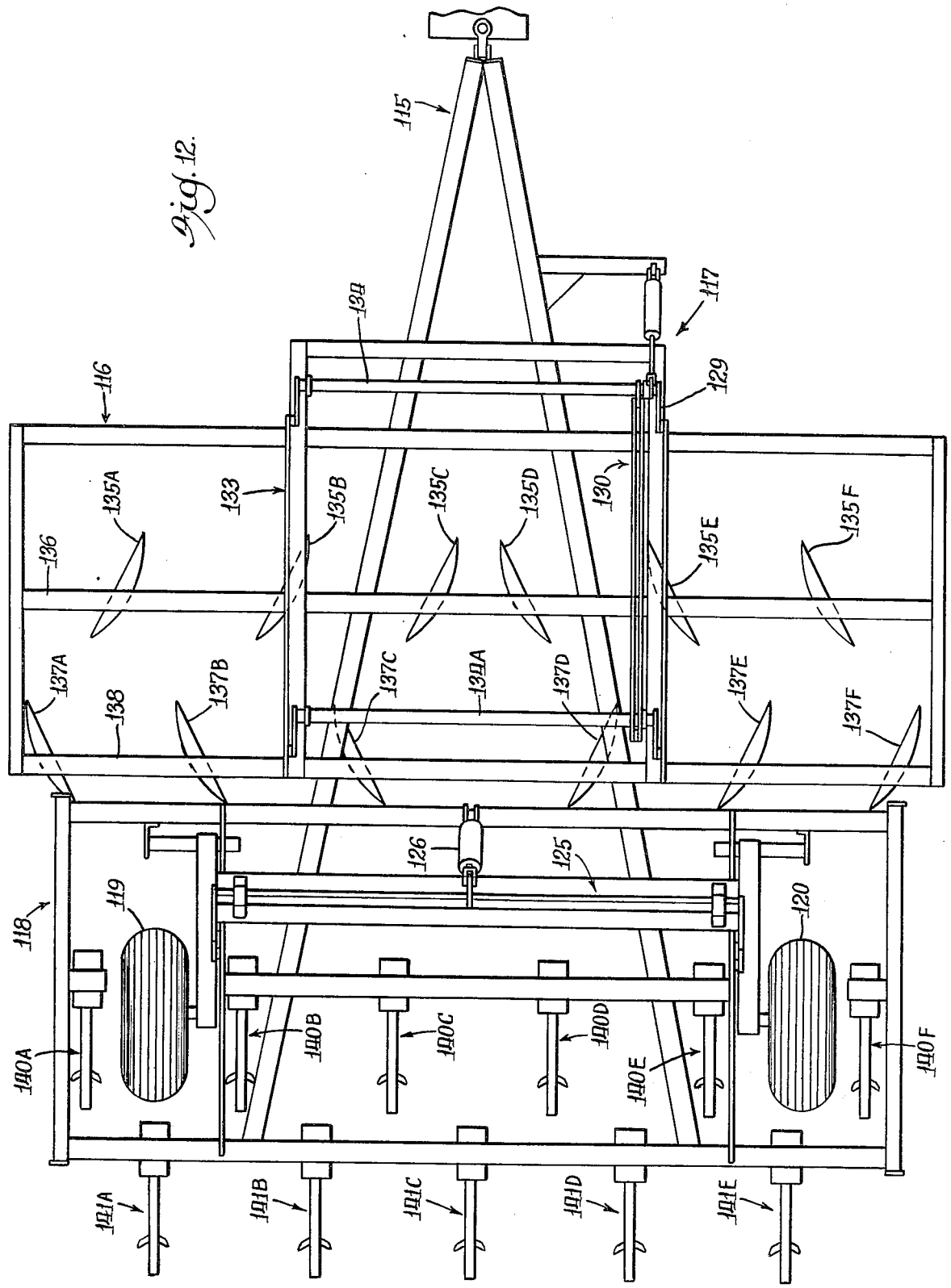

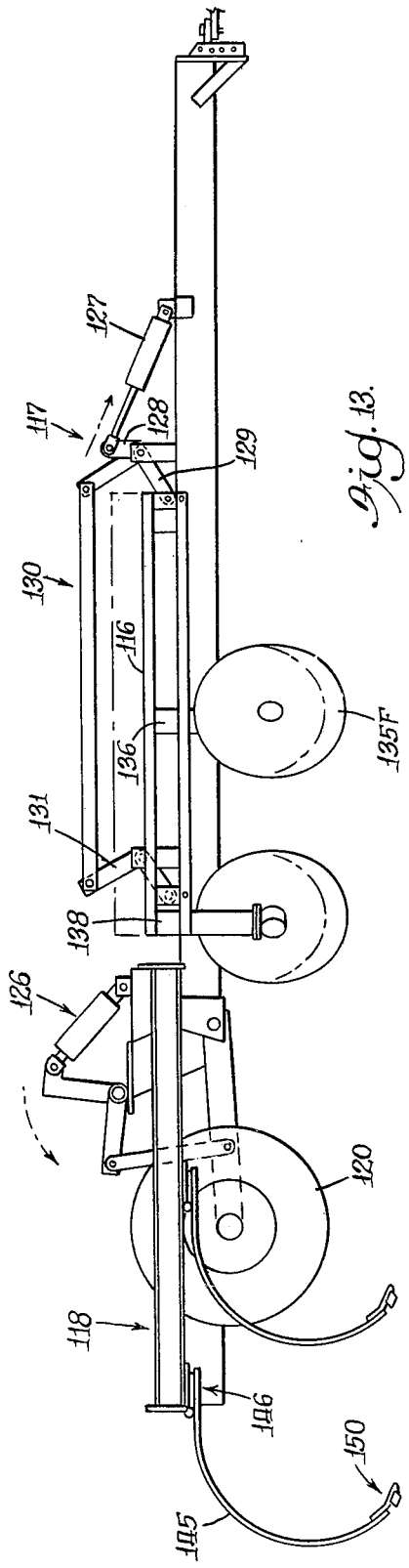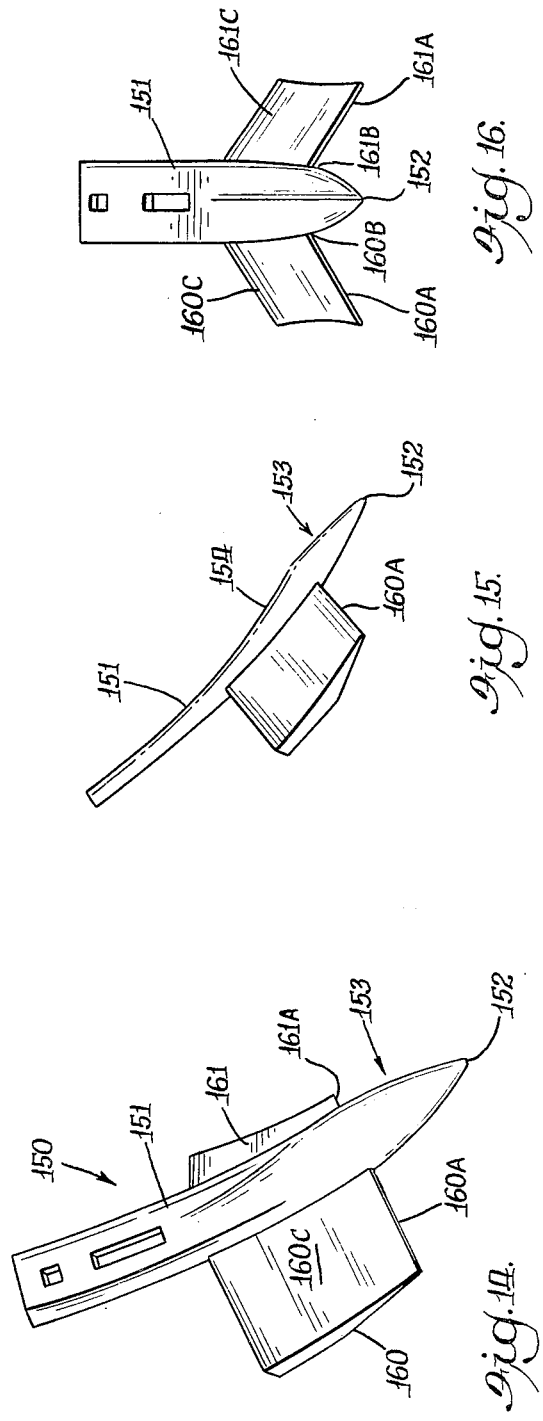

ONE-PASS COMPLETE TILLAGE SYSTEM

Background and Summary

The present invention relates to an agricultural tillage system; and more particularly, it relates to a tillage system which is capable of a complete working and plowing of unplowed ground in a single pass.

Perhaps the most commonly used tool for plowing is the conventional moldboard plow. Usually the plow bottom is set at a particular depth of plowing, for example eight or ten inches. These plows are typically mounted to a main beam which is inclined relative to the direction of travel of a tractor so that each moldboard is set to take a swath or strip of ground, cut it, and roll the ground over into a furrow formed by the next forward moldboard. The leading moldboard turns its strip of ground over into a furrow formed on a previous pass of the plow system. When a moldboard plow is used repeatedly to plow ground at the same depth, a layer of highly compacted soil is formed just beneath that depth. This is called the plow "sole", and it has the disadvantages that, due to its compactness, roots of plants have difficulty in penetrating it, and water has a tendency to drain over the plow sole rather than being absorbed by the soil. Further, a moldboard plow displaces to one side all of the soil that is tilled. Eventually, the ground must be plowed in the opposite direction, and even when this occurs, a deep side side ridge normally is left at the end swath. One advantage of the moldboard plow, not found in devices which work a more shallow depth is that they bring up deep soil and this is believed to be effective in reducing herbicide build up near the surface.

In the case where moldboard plows are used for tilling soil which has not previously been cleared, and may contain some "trash" (that is, crop residue which, in the case of corn, may be bulky and tough), a coulter may be located in front of each moldboard plow to cut through the trash and at least partly through the soil. This reduces accumulation of trash on the leading edge of the moldboard, and it further assists the moldboard in cutting the soil. Coulters are also used in connection with other tillage systems, and they generally are in the form of a relatively flat, circular blade.

Another form of blade that is used in tillage systems is referred to as a "disc", and it takes the shape of a dish or bowl. It is used both for cutting trash and for throwing some of the top soil to the side. Typically, a plurality of disc blades are arranged at a relatively close spacing, and they may be mounted on a common shaft which extends at an acute angle relative to a line transverse of the direction of travel of the tractor. When a gang of disc blades is pulled across a field, complete coverage is obtained. That is, all of the soil is tilled, the trash is cut up, mixed with the top soil and some trash is buried. Complete coverage is obtained because the spacing of adjacent discs is typically about forty percent of the diameter of a disc, and the discs are turned slightly to work a path.

In these devices, to reduce the effect of lateral soil displacement due to complete workage, a second line or gang of discs, facing the other direction, may be placed behind a first line. Similarly, a given line or gang may be formed in a chevron shape, symmetrical about the center line of the system. In all such cases, however, the effect of the disc blades is to work all of the soil, rather than selected strips, since the primary purpose of the disc is to cut the trash. If a farmer then treats the disced land with a chisel plow for deeper working of the soil, the chisel plow has the effect of digging up the buried trash, and bringing the trash back to the surface.

Other implements use disc blades, such as listers and bedders, but the function of the disc blades in these implements is to create raised beds for seeds, with lateral troughs for water collection or irrigation.

Another type of implement used to cultivate the soil is referred to as a cultivator sweep, and it takes the form of a V-shaped blade with laterally and rearwardly extending wings which are at the same horizontal level. This type of device breaks the soil and lifts it, but it has the effect of throwing loose soil to the side and compacting the soil beneath it, thereby creating a new plow sole.

The present invention is directed to a tillage system which is designed to do a complete tillage of the soil in a single pass. That is, it cuts and buries trash, and it also provides a controlled amount of deep soil plowing without creating a plow sole.

The system includes a pull-type frame with a forward line of disc blades which are widely spaced to part the trash. In one case, the discs are spaced laterally from one another at a distance greater than the diameter of the disc. Another way to say this is that the discs are spaced not to achieve full coverage, but rather to leave swaths of substantial width in relation to the width of the swaths actually cleared by a blade. This is in contradistinction to the spacing of conventional ganged disc blades where each line of discs gives full coverage of the ground. The discs of the present invention may be individually mounted and adjacent discs in the first line may face opposite directions. In this instance, the width of a swath of untilled ground is greater than twice the width cleared by a single disc. In this case, it is the spacing of the working surfaces, not the non-working surfaces of the discs which must be substantial.

A second line of disc blades, also widely spaced, is placed to the rear of the first line; and these blades are offset laterally from, and located in the windrows formed by, the discs in the first row. Thus, the discs in the second row part the windrows created by the discs of the first row. The discs of the second row are preferably mounted to face oppositely to the associated discs of the first row to return at least some of the soil and trash displaced by the first row. The spacing and location of the discs in the second row also leaves some of the soil undisturbed but having an accumulated layer of trash and loose soil on top.

Located behind the blades are novel tools or plow tips which are located in the strips of undisturbed soil with debris accumulated on top from the action of the blades. These tools each include a forward tooth for breaking the soil beneath the level of working of the disc blades. Wings extend outwardly and rearwardly of the tooth portion of the tool at a shallow angle. That is, the forward edges of the wings slope downwardly and slightly rearwardly from the point at which they join with the tooth. After the tooth breaks the soil, the wings raise, twist and turn the broken deep soil, thereby mixing the trash with top soil, evenly distributing the mixed soil and trash over the ground, burying a controlled amount of trash, and bringing up some deep soil. All of this is done without creating a plow sole.

The structure which cooperates to avoid creation of a plow sole includes the cutting edge of the tooth which is relatively narrow; the shape and orientation of the wings, the function of which is to lift, twist and roll the soil, without creating lateral displacement of the soil to any substantial extent; and the slope and location of the leading edge of the wings in relation to the shape and position of the tooth, which provide clearance for soil to pass beneath them without compacting it. By adjusting the depth of the tools relative to the disc blades, a controlled amount of the trash may be buried. Hence, for sloped land, lesser amounts of trash are buried, to prevent surface erosion; while for flat land where there is no fear of soil erosion, the trash can be buried more deeply.

The lateral spacing of the plow tips is wider than in a conventional chisel plow, and determined primarily by the configuration of the forward disc blades. That is, a plow tip is located in each strip of previously undisturbed soil. This insures that as ground is broken, the plow tip does not bring up previously buried trash, since it is desired to keep the trash buried. Other plow tips may be located in strips in which the top soil may have been cleared by a forward disc blade, but in which subsequent disc blades have accumulated a surface mixture of trash and top soil. This insures, through the twisting, turning action of the plow tip wings after the ground is broken, that the accumulated trash will be further mixed and more deeply buried.

Preferably, the disc blades are mounted on a frame which is vertically adjustable relative to the frame which carries the plow tips so that the depth of the disc blades can be varied relative to the depth of the plow tips. The deeper the disc blades work, the more deeply will the trash ultimately be buried. In this manner, as indicated, by adjusting for a more shallow working by the discs, more trash will be buried toward the surface after the system has completely worked the soil, resulting in reduced possibility of soil erosion.

It is also preferred that the disc blades be independently mounted for adjustment to control the "throw" of trash during working by the disc blades.

In summary, the present invention provides complete tillage in a one-pass system wherein forward, widely spaced disc blades are used to break up and windrow trash, and rear plow tips break the soil beneath previously undisturbed strips on which some trash preferably has been accumulated, while twisting and rolling the broken soil, thereby mixing the trash with top soil, evenly distributing the mixed soil and trash, burying a controlled amount of trash, and bringing up some deep soil. This is all accomplished without creating a new plow sole or digging up the buried trash, and while leaving the tilled soil free of ridges and furrows so that it can be subsequently seeded without substantial additional tillage.

Other features and advantages of the present invention will be apparent to persons skilled in the art from the following detailed description of preferred embodiments, accompanied by the attached drawing wherein identical reference numerals will refer to like parts in the various views.

The Drawing

FIG. 2 is a side view of the system of FIG. 1 with the tractor again shown in fragmentary form;

FIG. 4 is an upper, frontal perspective view of a plow tip;

FIGS. 5 and 6 are respectively plan and frontal views of the plow tip of FIG. 4;

FIG. 7 is a lower rear perspective view of the plow tip of FIG. 4 illustrating its attachment to a shank, with the parts shown in exploded relation;

FIG. 9 is a diagrammatic plan view of a portion of the system of FIG. 1 illustrating its operation;

FIG. 10 is a perspective view of a plow tip similar to that of FIG. 4, but with an elongated tooth for deeper plowing;

FIG. 11 is a close up side view, partly in cross section, showing the mounting of a disc blade;

FIG. 12 is a plan view of an alterante tillage system incorporating the invention;

FIG. 13 is a side view of the alternative embodiment of FIG. 9;

FIG. 14 is a frontal, side perspective view of an alternate plow tip; and

FIGS. 15 and 16 are respectively side and front views of the plow tip of FIG. 11.

Detailed Description

Figure 1:
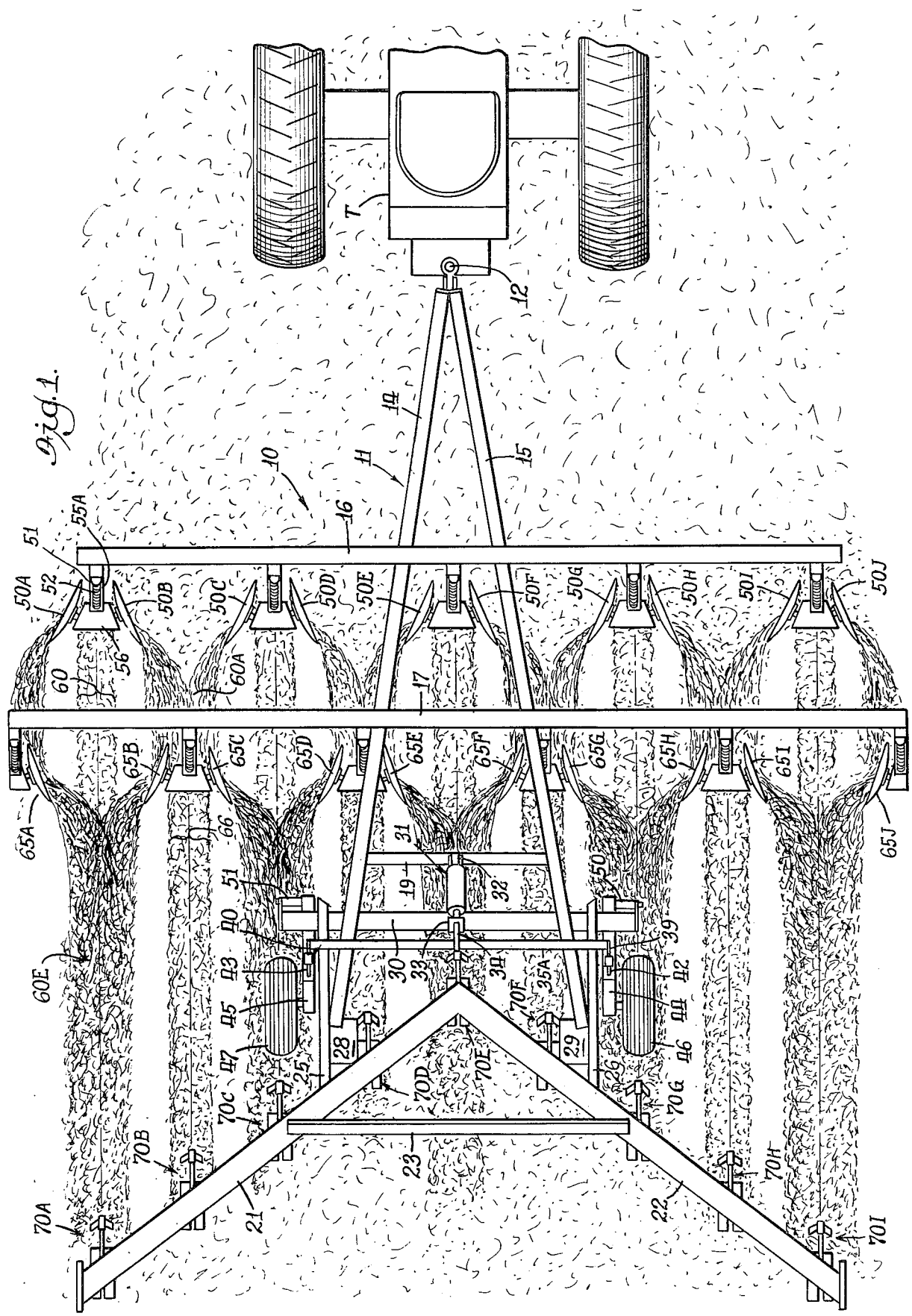
FIG. 1 is a plan view of a tillage system incorporating the present invention attached to the rear of a tractor, which is shown in fragmentary form.

Referring first to FIG. 1, a plow system generally designated 10 is shown as being pulled toward the right by a tractor designated T. The plow system includes a rigid frame 11 connected to the rear of the tractor T at a conventional hitch point 12.

The frame 11 includes a main draft frame comprising first and second side frame members 14, 15 in the shape of a narrow V when viewed from the operator's position—that is, the side frame members 14, 15 extend rearwardly and outwardly from the general location of the hitch 12. Two cross frame members 16, 17 are rigidly connected to the side frame members 14, 15, and these cross frames are used to form two lines of disc blades, to be discussed.

A third cross frame member 19 is connected rearward of the cross frame member 17; and whereas the forward cross frame members 16, 17 extend laterally beyond the side frame members 14, 15, and even laterally beyond the width of the tractor, the cross frame member 19 acts as a brace, extending only the width of the separation of the side frame members 14, 15 at the location at which it is mounted.

The rear of the frame comprises first and second beams 21, 22 welded together at their forward ends, again forming a general V-shape, but at a larger included angle than the previously described side frame members 14, 15. The beams 21, 22 are braced by means of a cross member 23; and they are welded to the rear ends of forwardly extending frame members 25, 26. The rear ends of the side frame members 14, 15 are also welded to the forwardly extending frame members 25, 26, at an intermediate position; and brace plates 28, 29 are used to strengthen the weldments just mentioned. The forward ends of the side frame members 25, 26 are rigidly connected to a cross member 30 which is mounted beneath them.

Figure 3:
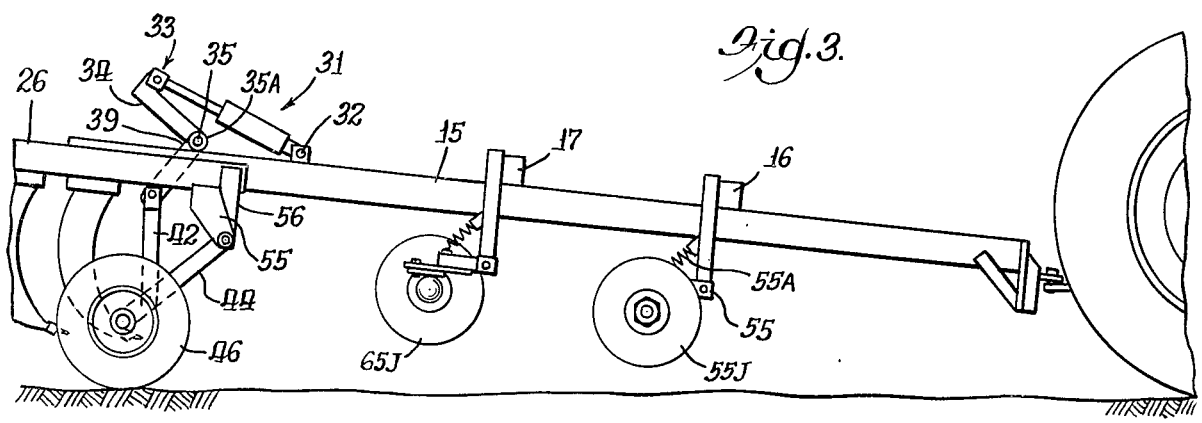
FIG. 3 is a fragmentary side view similar to FIG. 2 but with the tillage system in the raised or road travel position.

A hydraulic cylinder and piston rod generally designated 31 has its cylinder end pivotally connected at 32 to the cross frame member 19, and its rod end pivotally connected at 33 to a crank 34 (seen best in FIG. 3). The elbow of the crank 34 is attached to a crank shaft 35 which is fitted at its outboard ends with a pair of links 39, 40, the lower ends of which are pinned to the tops of a pair of thrust links 42, 43 respectively.

The lower ends of the thrust links are, in turn, pivotally connected to a pair of side wheel spindles 44, 45 which are provided with support wheels 46, 47. The upper ends of the wheel spindles are pivotally connected to short shafts 50, 51. As seen best in FIG. 2, shaft 50 is mounted between a plate 55 welded to the end of the cross beam 30, and a plate 56 extending downwardly and attached to the forward end of the forwardly extending frame member 26. The shaft 51 is similarly mounted to the other side of the cross beam 30.

In operation, when the hydraulic cylinder 31 is extended, its rod rotates the crank 34 counterclockwise to the position shown in FIG. 3, thereby forcing the links 39, 40 also to rotate counterclockwise, and raising the frame by downward force on the thrust link 42. The lift force is transmitted through a sleeve 35A which receives the crank axle 35 and is mounted to the upper surfaces of the inclined side frame members 14, 15. When the hydraulic cylinder 31 is retracted, the crank 34 is rotated clockwise to the position shown in FIG. 2 which causes the support wheels to be raised relative to the frame and the weight to be transferred to the blades and plow tips. The setting of the height of the frame by means of the hydraulic unit 31 may be used to control the depth of the plow tips, to be described.

Referring now to FIGS. 1 and 2, mounted to the first cross frame member 16 are a series of disc blades designated respectively 50A–50J which form what is referred to as a first line of disc blades. The blades, of course, need not be arranged in a straight line as illustrated. The individual disc blades are dish-shaped with a concave working surface for laterally displacing the soil and trash, and a peripheral cutting edge.

The disc blades of the first line are arranged in pairs for mounting, and each pair is similarly mounted, so that only the mounting for one pair need be described for an understanding of the system. Turning now to the mounting for the pair comprising blades 50A and 50B, a vertical member 51 is welded to the rear of the cross frame member 16. A rearwardly extending tubular member 52 is pinned to the lower end of the vertical frame member 51 (see the pin 55 in FIG. 2 for the mounting of discs 50I and 50J). A bracket 56 is mounted to the tube 52. A spring 55A is mounted between the upright 51 and the bracket 56 to bias the blades in the working position while permitting them to ride over rocks and the like.

Referring now to FIG. 11, the blade 50A is mounted to a spindle 56A which is rotatably mounted in a hub 56B. The hub 56B is welded to a plate 56C which, in turn, is bolted to the bracket 56 by means of a forward and a rear bolt, the rear bolt being seen in FIG. 11 and designated 56D. The forward bolt acts as a pivot point, and the rear bolt is received in a laterally elongated slot 56E formed in the bracket 56. By means of this arrangement, the blade can be individually adjusted by rotation about vertical axes. By rotating the disc to cut a wider path, more soil will be displaced laterally, and during operation, the soil and trash will be thrown more to the side than for a more shallow orientation of the blade.

The first line of blades includes four pairs of adjacent blades having their working surfaces facing each other (50B, 50C; 50D; 50E; 50F, 50G; and 50H, 50I) to cooperate in forming four windrows. The end blades 50A and 50J are arranged to move the soil outwardly relative to the center line of the system. It will be observed that where the non-working surfaces of the blades face each other (as with blades 50A and 50B, for example), the blades are also spaced apart so that there is a center strip diagrammatically illustrated by reference numeral 60, which is located between the non-working surfaces of the blades which remains undisturbed by the first line of blades. Although the lines of blades need not be straight, as mentioned, it is important that the space between the working surfaces of a blade and an adjacent blade be wide enough that even after the line has passed there be left a strip of undisturbed soil with trash accumulated on top, and that the width of this strip which is not cleared be substantial in relation to the width of a swath cleared by a blade. This reduces the number of blades for a given horsepower and increases the weight on each blade to enhance its ability to cut deeply and windrow the soil and trash. It further provides a strip of uncleared ground in which the rear plow tips can work without digging up buried trash, as will become apparent. Thus, the wide spacing of the blades in a line yields a strip of ground of substantial width, preferably greater than the width cleared by a blade, but good results can be achieved with spacings greater than eighty percent of the width of a swath cleared by a blade where the working surfaces in a line face the same lateral direction (embodiment of FIG. 12) and greater than one hundred and fifty percent of a cleared swath where the working surfaces face each other as in FIG. 1.

Behind the first line of blades, and mounted to the cross frame member 17, is a second line of similar disc blades, comprising ten blades designated respectively 65A–65J. Each of these blades is mounted in the same manner as described above.

It will be observed from FIG. 1 that each of the blades in the second line, 55A–55J is laterally offset from blades in the first row and placed so as to part a windrow formed by an associated blade in the first line. Further, where blades in the first line cooperated to form a single windrow, the blades in the second line part the windrow formed by associated blades in the first line, displacing some of the soil back in the lateral direction from which the windrow was formed, and leaving another strip of undisturbed soil, such as that designated 66 in FIG. 1, on which some trash windrowed by the first line of blades is left accumulated.

Considering the left side of the apparatus of FIG. 1, the adjacent blades 50B, 50C face each other and cooperate to form a single windrow 60A. Blades 65B and 65C in the second line have their working surfaces facing outwardly, and in opposite directions to the associated blades 50B, 50C in the first line. Further, the blades in the second line are located in the windrow 60A so as to cut and part some previously undisturbed soil and to displace the trash windrowed on that undisturbed soil by the pair of cooperating blades in the first line 50B, 50C, as described.

Not only is the first windrow parted and displaced, but the blades in the second line are arranged in facing pairs for accumulating the chopped trash onto the strips of soil left undisturbed by the first row. For example, the blades 65A and 65B in the second line accumulate trash onto the strip of soil 60 left undisturbed by the spacing of the blades 50A, 50B in the first line.

The lines of blades, when thus arranged, leave strips or swaths which are alternately cleared and undisturbed, at least some of the cleared trash being accumulated onto the strip of undisturbed soil. It will be observed from FIG. 1 that the blades of both lines are spaced to leave strips of soil of substantial width in relation to the width of a cleared swath. Even if adjacent blades have their working surfaces facing to the same side according to the present invention, the spacings of discs is such as to leave strips of undisturbed soil of substantial width in relation to cleared swaths; and preferably, the spacing of adjacent blades facing the same direction is at least 80% of the width of a swath cleared by a blade. The outermost blades in the second line, 65A, 65J may be spaced laterally outwardly at a slightly wider spacing than normal to catch more of the displaced soil from the associated blades 50A, 50J in the first line, if desired.

On the large rear chevron frame comprising beams 21, 22, there are nine individual plow tips designated respectively 70A-70I, at equal lateral spacings.

Turning now to FIGS. 2 and 4–7, each of the plow tips of this embodiment is similar in structure, and only one need be described further for a complete understanding of the invention. Each of the plow tips is mounted on a heavy shank 73, which is conventionally mounted to one of the beams 21, 22.

Referring now to FIG. 7, the lower end of the shank forms a nose, the upper surface of which is designated 75, and this forms a bearing surface for a groundbreaking and working tool generally designated by reference numeral 80. A transverse aperture 81 is formed in the nose of the shank 73 for securing the tool 80 by means of a bolt 83 and nut 83A.

The tool 80 is seen to comprise a narrow, flat member 84 (sometimes called a "tooth") which may be formed from hardened bar stock, and having a lower, sharpened cutting edge 85. First and second mounting plates 87,88 are welded to the bottom surface of the tooth 84, and they are held apart by a spacer 89. Slots 90, 91 are formed in the mounting plates 87, 88 for alignment with the aperture 81 on the nose of the plow shank, for receiving the bolt 83.

A pair of wings 96, 97 are welded to the sides of the tooth 84, and they are braced against the tooth and the mounting plates by triangular brace members 98, 99 respectively.

As best seen in FIGS. 5 and 6, the leading edges of the wings 96, 97, designated respectively 96A and 97A are sloped downwardly and rearwardly. The rearward slope of the leading edges 96A, 97A relative to a line transverse of the direction of travel of the plow tip (designated 97C in FIG. 5) is preferably about 30° for most soil conditions found in the Midwest of the United States. For general conditions this slope is less than or equal to 30°, in the range of 25°–30°, although, if soil ridging is desired for snow or water retention, the slope may be up to 40°.

The inboard ends of the leading edges 96A, 97A, are designated respectively 96B and 97B, and the location at which these points join the tooth 84 are above the leading cutting edge 85. The upper, working surfaces of the wings 96, 97 are preferably slightly concave. The curvature of the working surfaces of the wings, together with the rearward and downward slope of the wings and the relationship of the placement of the wings to the leading edge 85 of the tooth 84 cooperate to induce a twisting, turning motion to soil loosened by the breaking action of the tooth. By imparting a twisting, turning motion to the soil, rather than a rolling motion, the previously undisturbed soil above the wings is turned over to cover the trash accumulated above it, and to bury the trash in the furrow cut by the plow tip. In other words, although some of the soil is displaced laterally, the overall effect is to create an even distribution of the soil without ridges or furrows after the working by the discs and the plow tips. Further, the slight rearward and downward inclination of the leading edges 96A, 97A, together with the fact that the inboard points of these leading edges 96B, 97B are located above the breaking edge 85 provide clearance for loosened soil without compacting and thereby eliminate any appreciable formation of a new plow sole as the tools work the ground.

Operation of the First Embodiment

Referring back to FIG. 1, it will be helpful in following the overall system operation if the page is turned so that the tractor is headed toward the top of the sheet. Referring first to the operation of the disc blades, it can be seen that the blades 50B and 50C have their working surfaces facing one another. These blades each clear a respective strip of land and displace the trash and top soil laterally to form the windrow 60A. The strip of land 60 is left undisturbed by the first line of blades (and also by the second line of blades, as can be seen).

Turning now to the second line of blades, the blade 65B parts the windrow formed mainly by the blade 50B, leaving some of the trash on the undisturbed strip designated 66, and displacing some of the accumulated trash and the top soil and trash from a narrow strip of previously undisturbed ground to the left, to form, in cooperation with the blade 65A, a windrow 60E on top of the undisturbed strip 60. Similarly, the blade 65C parts the windrow formed primarily by the forward blade 50C, moving the loose trash as well as some top soil and trash from previously undisturbed ground to the right (opposite to the direction of movement of the trash by the associated forward blade).

In summary, each blade in the first line clears trash from a strip of ground, mixes it with some top soil, and provides windrows of accumulated trash and top soil on an adjacent strip left undisturbed because of the wide spacing of blades in the first row. The blades of the second line part the windrows formed by the first line and displace some of the accumulated trash as well as clear additional strips of ground, displacing the cleared trash and top soil in the opposite lateral direction than the associated blade in the forward line, but again leaving strips of substantial width due to the wide spacing of adjacent blades. In this sense, the "associated" blade in the forward line is the one which forms the windrow parted by the blade in the second line. For example, the blade 50B in the first line is "associated" with the blade 65B in the second line.

After the blades have worked the soil, there are left alternate strips of cleared land and undisturbed land, with the undisturbed land being covered with windrowed accumulations of trash and top soil from the cleared land. Each of the strips of undisturbed land on which the accumulated trash has been deposited is in line with one of the plow tips. Thus, there is no trash at the working level of the leading cutting edge of the plow tip—rather, the trash is accumulated on the top of the soil beneath which the plow tips are working, and the plow tips do not dig up previously buried trash. Rather, the plow tips, with the design of the wings as discussed above, break the soil beneath the previously undisturbed strips, turn the soil in a twisting motion to bury the trash while depositing the buried trash and soil in the same strip of land being worked by the plow tip. The result is that after the land has been completely worked by the entire apparatus, all of the soil has been loosened (to varying depth depending upon the position), the trash has been cut and buried, and the soil is evenly distributed across the width of the system without deep furrows or high ridges. This is accomplished without the creation of any plow sole, and while bringing up at least some deep soil for rejuvenation of the top soil for the next planting.

The same action is true of each pair of associated forward and rear blades, as seen for the right side of the system in FIG. 9. To better understand the operation of the discs at the angle of inclination relative to the direction of travel at which they are used in the present invention, the trash and soil which is displaced by the rear edge of each disc is thrown laterally further (as indicated by the arrow 100) than that which is displaced by a more forwardly located portion of the disc (see the arrow 101). Thus, the windrowed material is somewhat evenly distributed across the windrow, although some variation will be observed with operation at different speeds and for different soil conditions. The plow tip 70G is located on a line (see chain line 100A parallel to the direction of travel) and extending between the forward pair of blades 50G, 50H. Similarly, the plow tip 70I is located on a line 100C between the forward pair of blades 50I, 50J. A windrow is formed in the path of plow tip 70I by the cooperating blades in the second line designated 65I, 65J. The plow tip 70H is located along a line 100B which extends between the blades on the second line designated 65H and 65I which have their working surfaces facing outwardly rather than toward each other.

If it is desired to turn up soil from an even deeper depth than is accomplished by the plow tip of FIG. 4, the tooth can be extended as indicated at 84B so that when the shanks are normally placed, the cutting edge 85 will be located deeper in the soil. The plow tip may otherwise be the same as described in connection with FIGS. 4–7.

Figure 8:
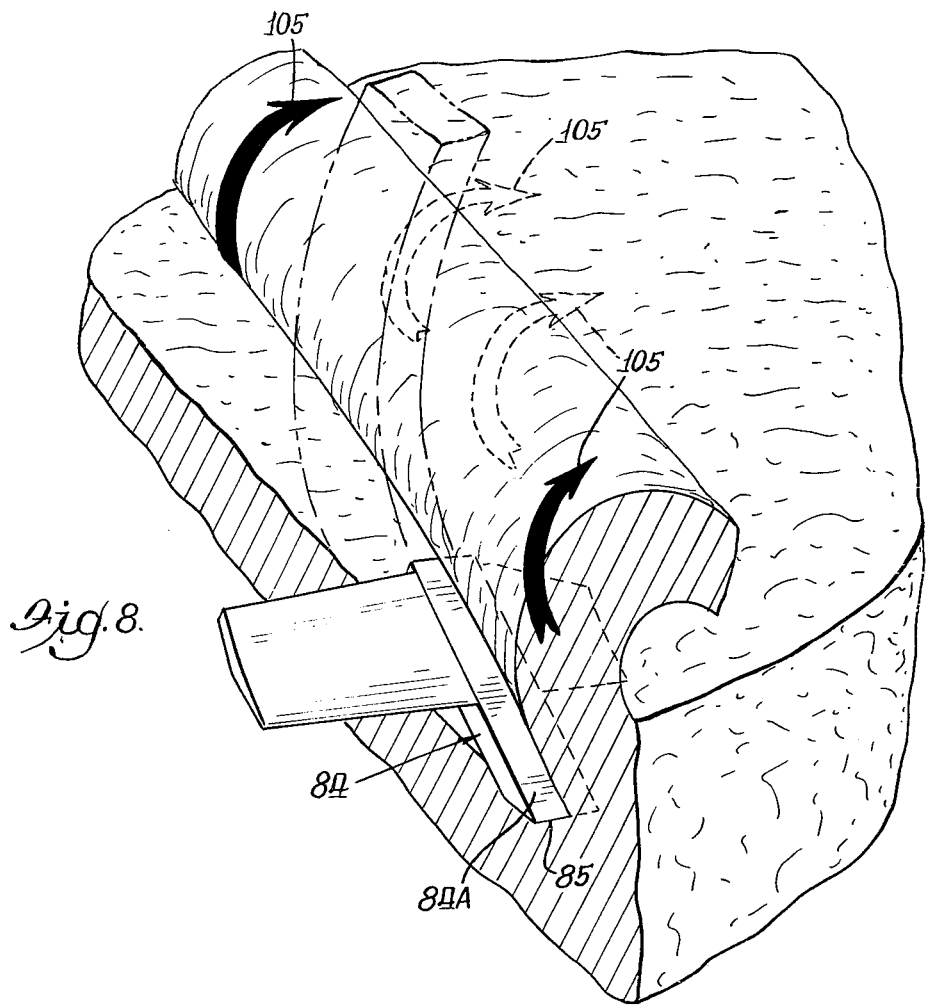
FIG. 8 is a perspective view of the plow tip of FIG. 4 illustrating its operation in the soil.

Referring now to FIG. 8, the action of the tool as it is pulled through the ground is diagrammatically illustrated. The cutting edge 85 on the tooth 84 has the effect of breaking the ground immediately preceding it. The upward, rearward inclination of the tooth 84 (namely, on the surface designated 84A in FIG. 8) assists in lifting the soil and causing further breaking of the soil. The wings, on the other hand, take the broken soil and twist it in the direction of the larger arrows 105, causing it to twist in the shape of a vortex. The twisting, turning soil further breaks apart, some of which, after mixing with accumulated trash, fills the void left by the tooth, and the remainder spreads evenly over adjacent areas due to the impact of the plow tip. The clearance beneath the wings avoids compacting the soil while permitting this action.

It is preferred that the plow tips operate along strips of land on which there has been a surface accumulation of mixed trash and top soil gathered by the working of the blades. The blades might be set at a depth of 3–5 inches, whereas the cutting edge of the tool may be set at a depth of 10–12 inches. By placing the cutting edge of the tool beneath the level at which the blades work, and by accumulating mixed trash and soil on the top of previously undisturbed ground, the plow tips do not dig up buried trash—rather, they bury trash accumulated on top of the area being worked. This is accomplished principally through the twisting, turning action provided by the rearwardly and downwardly swept wings.

By placing the discs at a wide spacing as defined above and by arranging subsequent lines of discs to split windrows created by previous lines, while forming their own windrows, the number of blades is reduced relative to conventional ganged discs, thereby increasing the weight and drawbar pull per blade for a given design and horsepower; and the spacing of plow tips can be much wider than is found in conventional chisel plows. By way of example only, in the embodiment of FIG. 1, wherein two lines of paired disc blades are used, and the blades have a diameter of 24 inches, the center line spacing of adjacent pairs is 60 in.; each blade is angled to clear a swath of about 9–10 in.; and the spacing between the leading edges of a pair of adjacent blades whose non-working surfaces face outwardly 10–12 in. Obviously these numbers may be varied depending on the depth at which the blades are set to work and the angle of the blades.

Embodiment of FIGS. 9–13

Turning now to FIGS. 12 and 13, a draft frame is generally designated by reference numeral 115, again having a general chevron shape. A forward box frame is generally designated 116, and it is vertically adjustable relative to the draft frame by means of a parallel life mechanism generally designated 117. A rear box frame generally designated 118 is mounted to the rear portion of the main draft frame 115. A pair of support wheels 119, 120 are mounted to the rear box frame 118 by means of a height adjustable mechanism generally designated 125 and actuated by means of a hydraulic cylinder 126, similar to that which has already been described in connection with the first embodiment.

As best seen in FIG. 13, the forward frame 116 is lifted by the hydraulic cylinder 127; and the adjustment mechanism includes an actuator arm 128 pivotally connected to the rod end of the hydraulic piston rod and cylinder unit 127. The other end of the actuator 128 is attached to rotate a link 129 which is connected to the frame 116. A parallel linkage generally designated 130 is also controlled by actuator 128, and it extends rearwardly to operate a crank 131 connected to the rear end of the box frame 116. A similar parallel linkage is located on the other side of the frame (see FIG. 12) for stability in lifting the frame. The two parallel linkages are connected together by means of crank axles 134, 135 which are, in turn, secured to the draft frame 116 to act as a base against which the forward or disc blade frame 116 is raised.

Six disc blades 135A-135F comprising a forward line of blades are mounted to a cross bar 136 of the adjustable disc frame 116. The mounting structure for the discs 135A-135F may be similar to those already disclosed, and they are therefore not shown for clarity. A second line of blades designated respectively 137A-137F is mounted to a cross bar 138 of the adjustable frame 116. Again, the mounting structure is similar to that which has already been described and need not be shown for brevity.

Referring now to the rear frame 118, a first plurality of plow tips designated 140A-140F are secured in a first transverse line, and a second plurality 141A-141E are secured to the rear frame 118 along a second line.

Turning now to FIG. 13, the plow tips are each similarly mounted, including a curved spring shank 145 which is mounted by a conventional spring mount 146 to the frame 118. Each spring shank is provided with a ground working tool or plow tip generally designated 150 and seen in more detail in FIGS. 14–16.

The tool 150 includes a downwardly and forwardly curved tooth 151 which is narrowed to a point at 152 and has a central work surface 153 generally in the shape of a knuckle. Immediately behind the work surface 153, the tooth slopes at 154 to conform to the narrow width of the shank portion of the tooth.

As with the previous plow tip, a pair of wings 160, 161 extend laterally of the tooth 151, and they are provided with associated leading edges 160A and 161A which are sloped rearwardly and downwardly from locations 160B and 161B to the rear of and above the point 152. The work surfaces 160C, 161C are also concave to provide the rolling, twisting action for the broken soil. The shape of the leading edges and their relationship to the work surfaces 153 and point 152 again eliminate the creation of a plow sole even for repeated passes. The embodiment of the plow tip and spring shank of FIGS. 12–16 is designed for more shallow working of the soil than is the case with the first embodiment.

Operation of the Embodiment of FIGS. 12–16

Referring back to FIG. 12, as indicated, there are two lines of disc blades. In the forward line, the three blades to the left of the center line, 135A–135C, throw soil in the same direction (namely, to the left), and they are widely spaced relative to each other. The other three blades throw soil to the right. The three disc blades 137A–137C face to the other side; and they are located so as to part the windrow created by the associated blade in the forward line, and create a second windrow of soil and trash displaced in the opposite lateral direction. Thus, the combination of first and second lines of disc blades forms alternate strips of (a) cleared ground, (b) first windrows (previously undisturbed ground on which some accumulated debris has been thrown, the amount depending on the angle of the blades, the speed of the vehicle, etc.), and (c) second windrows.

The first line of plow tips 140A–140F are located to work directly beneath the windrow created by an associated pair of disc blades, one from each of the first and second lines. For example, the tip 140A is located to work in the windrow created by plow blades 135A and 137A. The plow tips located in the second line are placed to work in strips of previously undisturbed ground, i.e. the plow tip 141A is located between blades 135A and 137B. The strip may have accumulated trash and top soil on top of it because of the more narrow spacing of the blades. For example, for the strip in which the plow tip 140A works, debris may have been thrown either by the disc blade 135B in the first line beyond the reach of its associated blade 137B, or it may have been thrown widely by the blade 137A in the second line.

By way of further example, for the embodiment of FIG. 9, the blades may have a 24 in. diameter, be spaced at 38 in. from adjacent blades, and be angled to clear a 10–11 in. swath. The rear blades are centered in the spaces between the forward blades and leave swaths of undisturbed soil approximately 9 in. wide on both sides (i.e. one such swath for each plow tip).

Both embodiments provide a first working of the top soil with the disc blades which cut the trash and windrow at least a portion of it. The lateral spacing of the blades is made wide so as to leave swaths of undisturbed soil of substantial width in relation to the width of the cleared swaths. Hence, the blades also windrow or accumulate mixed trash and top soil. A second line of blades located in previously undisturbed soil, parts, windrows and moves the first windrow in the opposite direction. The blades are followed by a plurality of plow tips including tools which are located in the strips of previously undisturbed soil on which trash and top soil have been accumulated by the blades. The plow tips not only break the soil at a location deeper than was worked by the blades, but they are provided with wings which twist and turn the soil, replacing the soil dug out with trash and top soil and causing an even distribution of the mixed soil and trash across the entire width of the system. The plow tips further bring up deep soil without creating a plow sole. In the case of the embodiment of FIG. 12, the blades are mounted on a vertically adjustable frame so as to control the working depth of the blades. The deeper the blades work, the deeper will the trash ultimately be buried, as may be useful in slightly sloped or flat terrain. If the blades work at a more shallow depth, more trash will be at the surface, and this may be useful in controlling erosion.

Having thus disclosed preferred embodiments of the invention, persons skilled in the art will be able to modify certain of the structure which has been disclosed and to substitute equivalent elements for those described while continuing to practice the principal of the invention; and it is, therefore, intended that all such modifications and substitutions be covered as they are embraced within the spirit and scope of the appended claims.

I claim:

1. Tillage apparatus adapted to be pulled by a vehicle, comprising: a frame; wheels for supporting said frame; a first plurality of disc blade means carried by said frame in a first line, each blade means having a concave work surface for clearing a strip of top soil and trash, mixing them and displacing the mixture laterally in a first windrow, said blade means of said first plurality being widely spaced laterally to form alternate strips of cleared land and windrowed trash and soil on previously undisturbed soil; a second plurality of disc blade means carried by said frame in a second line behind said first line, said blade means of said second plurality being located to part the windrows formed by said first plurality of blade means and to displace at least some of the accumulated mixture in said first windrows, and to clear some previously undisturbed soil for forming second windrows laterally displaced from said first windrows, said second windrows being at least partly on previously undisturbed soil; a plurality of plow tips carried by said frame behind said blade means, said plow tips being located in said second windrows and including a forward edge for breaking soil at a depth greater than the working level of said blade means, said plow tips further including wing means for twisting the broken soil, thereby mixing the broken soil with the windrowed trash and top soil, and distributing the mixture without creating a new plow sole; a shank for mounting each of said plow tips connected to said frame in depending relation, each plow tip including a nose portion defining a forward cutting edge for breaking the soil and an upper and rearwardly inclined work surface for lifting the broken soil, each tip further comprising first and second mounting plates extending beneath said nose rearwardly of said cutting edge and spaced to receive an associated shank, and fastener means for securing said mounting plates to said shank; said wing means comprising first and second wing members mounted respectively to the sides of said nose portion of said plow tips, each wing member including a leading edge extending from a point on said nose portion above and to the rear of said cutting edge thereof, downwardly and rearwardly at an angle of about 30° relative to a line transverse of the direction of travel of said vehicle.

2. The apparatus of claim 1 wherein said plow further comprises first and second laterally extending braces for bracing the underside of an associated wing against one of said mounting plates.

* * * * *